Jan. 22, 1935.　　　　G. D. ARNOLD　　　　1,988,677
DEHYDRATING APPARATUS
Filed March 1, 1930　　　3 Sheets-Sheet 1
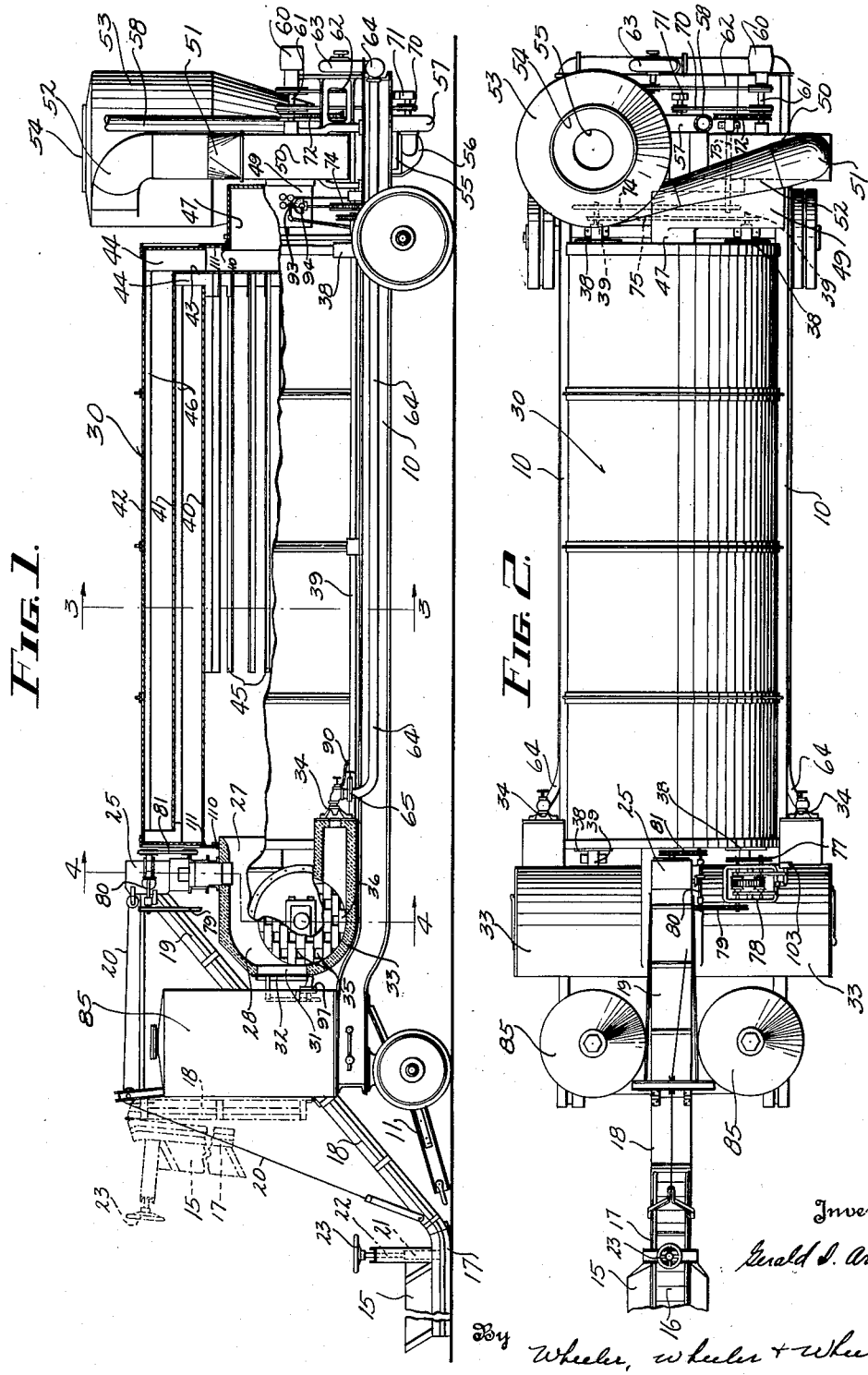

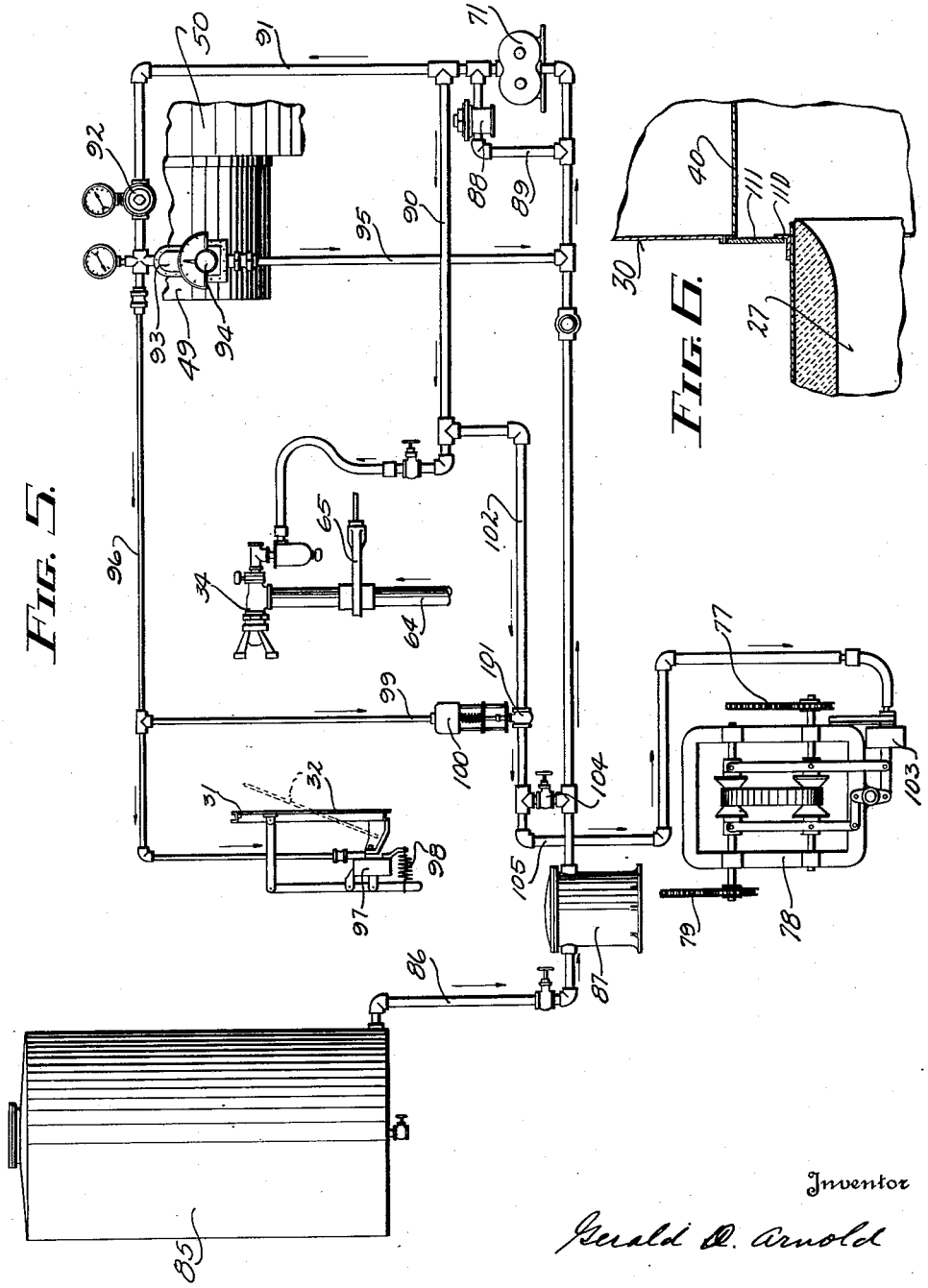

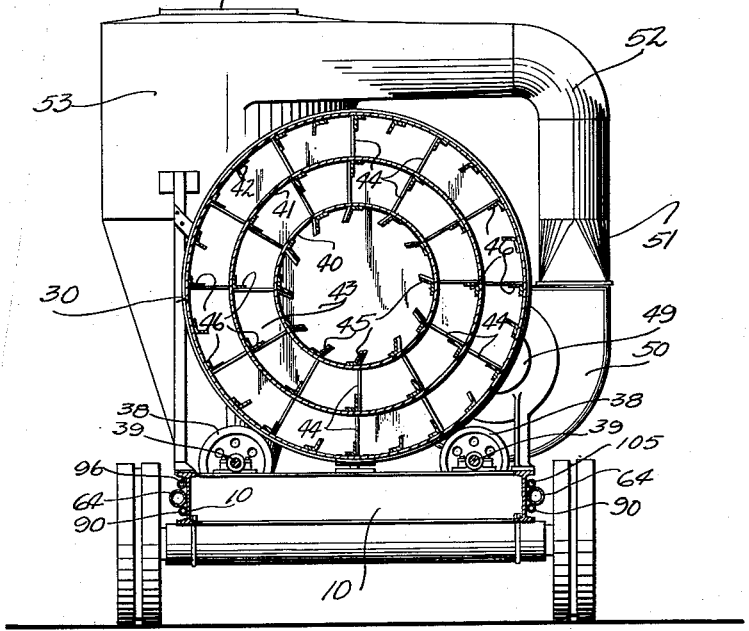
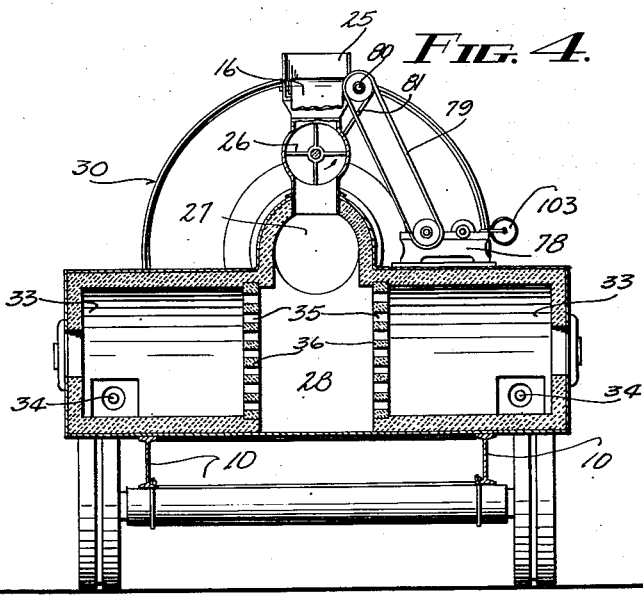

Patented Jan. 22, 1935

1,988,677

UNITED STATES PATENT OFFICE 1,988,677

DEHYDRATING APPARATUS

Gerald D. Arnold, Galesville, Wis.

Application March 1, 1930, Serial No. 432,366

13 Claims. (Cl. 34—5)

This invention relates to improvements in dehydrating apparatus. This application is a companion to my application filed August 31, 1928, Serial No. 303,158.

It is a primary object of the present invention to provide a drier which will economically handle large quantities of material and rapidly dehydrate such material with a minimum expenditure of energy.

More specifically stated, I propose to use relatively large volumes of heated air and gas in the dehydrating operation, to convey pneumatically the material to be dehydrated through a chamber of increasing cross section through which the material can only move when it is dehydrated sufficiently to respond to the decreased velocity of fluid currents; to conduct the entire dehydrating operation at pressures less than atmospheric; and to operate under such complete control as to deliver a substantially uniformly dried product. It is most important to the achievement of this last objective, that all air should be excluded from the drying chamber other than that purposely admitted thereto and completely subject to control.

It is a further very important object of the invention to provide dehydrating apparatus which is portable. While the apparatus herein disclosed is adapted for a wide variety of uses and may act upon a wide variety of materials, it is contemplated that it will realize a principal field of usefulness in the dehydration of agricultural products, and particularly forage crops such as corn, alfalfa, grass, peas, soy beans, and the like. The transportation of such crops is frequently needlessly expensive because of the large volume of, and weight of, the water contained therein. By dehydration in the field or near the field where the crop is grown, much of this expense is saved and the dehydrated product retains all of the qualities and advantages of the natural crop including color, taste, nutrition and vitamin content. More particularly, however, the feature of portability makes it possible to reduce the overhead of an expensive piece of equipment such as the apparatus herein disclosed, by keeping it substantially constantly in operation at different points. It may be used, for example, to dehydrate a whole succession of crops for a number of different farmers, and it may also be used to dry pea vinery waste in accordance with the disclosure of the companion application above referred to, and the waste of corn and cabbage canning factories, and others. The present invention therefore seeks to achieve that degree of compactness and that arrangement of the parts of a complete and self-contained unit which will permit of the unitary transportation of complete dehydrating apparatus.

It is a further important object of the invention to provide a set of controls by which temperature and the admission of air and the rate of feeding the green material to the apparatus are automatically governed with the degree of sensitiveness which is necessary in order to secure uniform output of high quality. Uniformity is very much to be desired and it has not been wholly achieved by hand methods of control, partly because of slowness of response and partly because of lack of accuracy. By the means hereinafter described, I have succeeded in obtaining a very high degree of accuracy in control, and a substantially perfectly uniform product.

Finally, where the apparatus herein disclosed is used for drying agricultural produce, it is a further important object to leave such produce with substantially its original color, flavor and food value, to a degree not heretofore achieved in any other dehydrating equipment involving other than laboratory methods.

In the drawings:

Figure 1 is a side elevation of apparatus embodying this invention, the wall of the drum and a portion of the heating unit being broken away to expose the interior construction in vertical axial section.

Figure 2 is a plan view of the apparatus shown in Figure 1.

Figure 3 is a section taken in the plane indicated at 3—3 in Figure 1.

Figure 4 is a section taken on the line 4—4 in Figure 1.

Figure 5 is a diagram of the system of controls.

Figure 6 is an enlarged fragmentary detail showing in section a part of the supply conduit and a part of the drum at the point of communication therebetween, and illustrating the gasket by which undesired air is excluded from the drum notwithstanding its rotation respecting the supply conduit.

Like parts are identified by the same reference characters throughout the several views.

The entire apparatus is assembled upon a wheel supported frame 10, of which the tongue 11 may be drawn by a tractor to pull the apparatus from place to place. The dehydrating mechanism will be described in the order of travel of material through the machine, after which I shall describe the actuating connections and controls.

Feeding device

The previously comminuted material is deposited in the hopper 15, the bottom of which comprises a conveyor 16 operating in the conveyor trough made up of sections 17, 18, and 19. The various sections are hinged together and may be drawn upwardly by means of cable 20 to the collapsed position indicated by dotted lines in Fig. 1. The fact that the hinge between sections 18 and 19 is located at the upper surface of such sections, and the hinge between sections 17 and 18 is located at the lower surface of these sections, results in equalizing the tension and slack produced in the conveyor stretches by hinged collapse of the trough.

It is immaterial how the comminution of the wet material is accomplished. Preferably it will be cut up in the field into small pieces at the time of harvesting, thereby facilitating transportation to the machine. The material may, however, be harvested in the usual manner and delivered to an ordinary ensilage cutter which discharges directly into the hopper 15. In any event, the material is preferably chopped up into small pieces prior to delivery to the hopper, so that the cut ends of the material will expose their water content to the action of the drying gases. If, however, some grain or malt, or like material is to be dried, it will merely be dumped in the hopper without comminution.

The forward wall of the hopper comprises a gate which is shown in dotted lines at 21 in Fig. 1, and may be adjusted vertically by means of the screw 22 operated by hand wheel 23. Clearance between this gate and the conveyor 16 will determine the depth of material which will pass from the hopper upon the conveyor apron. This depth will be controlled by manually varying the position of gate 21 in accordance with the kind of material to be dried. It will be obvious that this apparatus constitutes a means for regulating the rate of feeding the dehydrating apparatus. If the material is wet, it will be desirable to reduce the thickness of the layer thereof on the conveyor in order not to feed the machine too rapidly. If, on the other hand, the material is relatively dry, the gate 21 can be raised to allow a relatively thick layer of material to pass upwardly on the conveyor.

At its upper end the conveyor 16 discharges into a throat 25 through which delivery of the green material is controlled by means of a rotary valve 26. This valve cuts off direct communication with the outer air and thereby prevents air from entering in any substantial quantities with the material to be dried. The rate of rotation of the valve will be so determined that the valve will carry away the material at substantially the exact rate at which it is delivered into the throat 25 by the conveyor.

Source of hot gases

The material discharged by the valve 26 falls into a stream of heated gases traversing the feeding nozzle 27 which leads from the mixing chamber 28 into the central compartment of the drum 30, later to be described. The movement of gases through nozzle 27 is produced solely by the partial vacuum or depression existing within the drum, due to the action of a powerful exhaust fan at its outlet end. The gases utilized include such air as is admitted through the port 31 under the control of door 32, together with the products of combustion incident to the burning of fuel in one or more combustion chambers, of which two are illustrated at 33.

While coal or any other solid fuel may be utilized for the purposes of this invention, I prefer for several reasons to use oil or gas. The hydro-carbon furnaces illustrated in the drawings are not only efficient, but minimize the size of the heating plant, and their output is virtually free of sufficient quantities of soot and odorous vapors to affect the appearance or taste of the material to be dehydrated.

The two combustion chambers 33 are substantially cylindrical, and the respective fuel nozzles 34 are arranged tangentially as shown in Fig. 1. The products of combustion will travel helically through the respective combustion chambers toward the mixing chamber 28, which they reach through the openings 35 in the partition walls 36. In the mixing chamber 28 the products of combustion are mixed with the air, if any, admitted through door 32.

The diameter of the feeding nozzle 27 will be so determined with reference to the capacity of the machine, that the velocity of gases therein will at all times be sufficient to project the wet material supplied through throat 25 pneumatically into the interior of drum 30. The drum is so arranged, however, that the velocity of gases passing therethrough is reduced repeatedly. The structural organization of the drum is so important to the successful dehydration of material passing therethrough, that it will be described in some detail.

The dehydrating drum

The drum 30 is a boiler-like structure mounted to turn as a unit upon the wheels 38 which turn with shafts 39 extending longitudinally of frame 10, and drive the drum. In order to secure the compact form so necessary for a portable dehydrating outfit of large capacity, and in order also to secure that repeated reduction in gas velocity which contributes so much to the successful dehydration of material passing through the drum, the drum is preferably made up to comprise a plurality of concentric tubes 40, 41, and 42. The innermost tube 40 is connected to that end of the drum through which the material enters by means of nozzle 27. It terminates in spaced relation to a disk-like baffle 43 which is spaced from the opposite end of the drum and closes the end of the intermediate tube 41. The intermediate tube in turn is spaced from the front end of the drum as shown at the left in Fig. 1. A series of radial struts 44 braces the several tubes from each other to make a rigid assembly.

The rigidity of individual tubes is enhanced by longitudinally extending flanges which may be forwardly inclined in the direction of drum rotation, as shown at 45, or may be radial as shown at 46. These flanges act as pockets to lift the green material to the top of the respective drum, and to drop it into the path of the gas stream traversing the drum. It will be understood that the gas entering through nozzle 27 passes the whole length of the innermost tube 40, is turned by baffle 43, and passes toward the front of the machine the whole length of the intermediate tube 41; and is turned by the front end of the drum and passes to the back end of the machine the whole length of the outer tube 42. It then passes centrally around the face of baffle 43 and through the outlet duct 47. The constantly increasing cross section of the various compartments of the drum causes a corresponding diminution of velocity of the gases, except at the points where the gases are changing their direction. At these points the area is purposely restricted to increase momentarily the gas velocities, and thereby to prevent the lodging of material at these points.

*Means for handling dried materials*

It will be obvious that the weight of the material to be dried will be reduced proportionately to the amount of water extracted in the drying operation. The amount of water in materials ordinarily dried is generally from 50% to 85% of the total weight of the material. Consequently each particle of material undergoes a very great change in weight as it progresses through the machine. This fact is utilized to control automatically the time for which the various particles remain in the machine.

When the blast of hot gases entering through nozzle 27 pneumatically projects the green material into the inner tube 40 of the drying drum 30, the weight of the various particles of material to be dried causes them to drop to the bottom of the tube. In the rotation of the tube these particles are carried by flanges 45 to the top of the tube where they fall from the flanges through the blast of hot gases. Naturally, the lighter particles will be advanced along the drum by the blast of gases more rapidly than will be heavier particles. This is very advantageous because the gases at this point are at maximum temperature (averaging about 1000 or 1500 degrees Fahrenheit, although a great range of temperatures is practicable above and below the points specified) and prolonged exposure of minor particles of forage to such high temperatures would be deleterious, and would result in too great a drying action, notwithstanding the fact that no material oxidation could occur because of the almost complete absence of oxygen.

The amount of air admitted through door 32 is not sufficient to support combustion, and the air admitted through the burner ports 34 delivers up substantially all of its oxygen for the combustion of the hydro-carbon fuel. Even though combustion of the material to be dried is impossible, therefore, it is an advantage to have the very small and light particles of such material move through the machine more rapidly than the heavier particles, and this occurs automatically as the particles are successively dropped across the path of the blast of gases.

The rate of evaporation from all of the particles will be very high due to the tremendous volume of very dry gases to which the particles are exposed, and due also in large part to the fact that the pressures existing in the drying drum are sub-atmospheric. The material in its wettest form is exposed to the gases when they are hottest and driest. The relatively large quantity of moisture, and also the high velocity and rapid reduction of temperature, keep the material from burning and flavor change in the presence of heat which would be excessive upon drier material or for longer periods.

It will be noted that no blower is employed at the inlet end of the device, except that which supplies the air blast required for the particular oil burners illustrated. The current of gas through the passages of the drying drum or chamber is created almost solely by the action of the exhaust fan at the outlet.

As the particles of average size and larger deliver up their moisture, they too become light and move more and more rapidly through tube 40, until ultimately a continuous stream of material is being delivered from tube 40 into the larger concentric tube 41.

The diameter of tube 41 is so much greater than that of tube 40 that the velocity of the current of drying gases therethrough is materially reduced. Another factor contributing to the reduction of gas velocity in the successive tubes of the drum, is the decrease in temperature occasioned by the evaporation of moisture. It will be noted that there is very little heat loss by radiation in this device, due to the fact that the outer compartment therein is in a position to intercept any heat radiating from the two inner compartments. By the time the gases reach the outer compartment, their temperature is very much reduced so that the high radiation loss which would occur if the outer shell were filled with gas at the original high temperature, is quite largely avoided.

In the intermediate shell and the outer shell, as well as in the inner shell or tube 40, the rotation of the drum is continually carrying material to the top thereof and releasing it to fall through the gas currents to the bottom. In practice, the material is not discharged all at once but commences to drop about 120° before reaching the extreme top and continues to be discharged until well past the top position, when properly designed bucket flanges are used. In the outer chambers this results in discharging material on both sides of the central tube or shell, as well as sifting down over the relatively high temperature inner shell.

In each such cascade of partially dried material the lighter (and consequently the most highly dried) particles will move most rapidly with the air blast. As a result of this factor there is a tendency for all material to leave the machine as soon as it is fully dried, and the result tends strongly to equalize the extent to which all particles of material issuing from the machine are dried.

From the outer compartment within the exterior shell 42 of the drying drum, the dried material and stream of gases passes centrally about the baffle 43 and through the outlet passage 47 which is laterally extended at 49 to the axial inlet of the fan casing 50. This fan must be sufficiently large and powerful to produce the desired current of gas through the drum 30. Its tangential delivery spout 51 discharges into a pipe 52 which leads across the front of the machine to the top of an ordinary centrifugal separator 53 into which the gas and material is delivered tangentially to effect the separation thereof by the vortex thus created within the separator. The water laden gas then issues from the opening 54 at the top of the separator. It will be found that the gas will be virtually saturated at its discharge temperature if the various factors relating to efficient drying have been properly worked out in accordance with the considerations hereinafter explained.

The dried material drops through the bottom opening 55 in the separator into the receptacle 56 at the inlet of a pneumatic conveyor fan 57. This fan may comprise an ordinary centrifugal blower of which the discharge pipe 58 may lead to a silo, bin, bagging machine, or any other objective.

While all the particles of material issuing from the machine will be more or less uniformly dried to approximately the same degree for the reasons above explained, this degree of dryness may vary in accordance with a large number of factors including particularly the temperature, dryness, and rate of flow of the gases passing through the drying drum, the rate at which wet material is supplied through the machine, and the degree of wetness thereof, and also the temperature and the extent to which the natural juices of the material are exposed for evaporation.

Those skilled in the art will perceive that for any given gas conditions and kind of material, the amount of water which will be extracted by the dehydrating apparatus will be a relatively fixed quantity, and consequently the dryness of the discharged material may depend directly upon the rate at which the material is fed to the machine. Particularly if the rate of feeding exceeds the capacity of the machine for extracting moisture to the desired degree of dryness, the product may not be sufficiently dehydrated. The effect of the incoming material is almost immediately manifested in reduction of the temperature of the gases supplied from the mixing chamber 28, both by direct absorption of heat by the material itself, and by the evaporation which occurs in proportion to the presence of quantities of wet material.

In view of the foregoing considerations, it is very important in a machine of this character to feed the machine in such a way that the rate at which wet material is supplied thereto, can be maintained almost perfectly uniform for any given condition. It is also desirable to be able to vary the rate of feeding instantaneously to correct any factors tending to upset the balance which has been found to give the desired dehydration. The feeding conveyor and leveling gate 21 have been found very satisfactory for maintaining a uniform rate of feeding. The controls and driving connections now to be described may be set to care automatically for any matters requiring correction to produce a uniformly satisfactory product.

Driving connections

It is contemplated that the dehydrating apparatus will be driven from the tractor which pulls it from place to place. In the dehydrating apparatus the source of power is the pulley 60 on blower shaft 61. From this shaft a belt 62 drives the blower 63 which supplies an air blast through pipes 64 to the two burners, the blast of each burner being individually controlled by the gate 65 appearing near the burner in Fig. 1. It would not be impractical to control the burners automatically by the same means hereinafter described, but ordinarily this is unnecessary for reasons hereinafter mentioned.

Shaft 61 also drives, by means of a belt or chain 70, the runner of the blower fan 57 and, on the same shaft, the oil pump 71 which comprises a gear pump illustrated diagrammatically in Fig. 2, and shown more particularly in Fig. 5.

From the primary driving shaft 61 a chain 72 drives a jack shaft 73 from which another chain 74 drives one of the longitudinally extending shafts 39 for the support and drive of the drum. Chain 75 connects the two drum driving shafts so that the respective rolls 38 turn simultaneously in the same direction to rotate the drum.

Power for the operation of the rotary valve 26 and the conveyor 16, is taken from one of the shafts 39 as shown in Fig. 2. A chain 77 leads from shaft 39 to the driving shaft of a commercial rate changing device 78, of which the power output shaft is connected by chain 79 with the conveyor drive shaft 80. The shaft 80 in turn is connected by chain 81 with the rotary valve. This arrangement insures that the rotary valve will operate as rapidly as material is supplied thereto, and it provides for simultaneous variation in the rate of operation of the conveyor and valve in accordance with the adjustment of the rate changing mechanism designated in its entirety by reference numeral 78.

The system of controls

Oil contained in the supply tanks 85 is utilized for controlling the operation of the dehydrator, as well as for supplying the burners 34. The use of two separate tanks is merely for convenience in positioning the feed conveyor trough, and the two tanks may function as one, being interconnected. The oil supply line 86 runs through a filter 87 and the intake side of pump 71 from which the oil is discharged at relatively high pressure. The pressure used commercially in this particular apparatus amounts to fifty pounds. This pressure is maintained by a loading valve 88 in a by-pass line 89 around the pump, so that any excess of pressure will leak through the by-pass to maintain the pump output uniform at fifty pounds.

From the output of the pump a high pressure line 90 leads to the burners 34 where air, supplied through pipe 64, is carbureted and discharged for combustion into the chambers 33. The helical path of flame and gases in the combustion chamber insures a sufficient length of travel so that thorough combustion may result before the products of combustion pass through the foraminous walls 36 into the mixing chamber 28.

From the pump another high pressure line 91 leads to the reducing valve 92, where the pressure is reduced sufficiently so that it can be handled by the thermostatically controlled valve 93.

I have found, and it is important to note here, that in normal operation of the device herein disclosed, the dryness of the finished product will be substantially directly proportioned to the temperature of the gases at the outlet end of the machine. If this temperature rises too high, it will invariably be found that the finished product has been too completely dried. If this temperature drops below a proper value, it will be found that the material is not sufficiently dry.

Accordingly, I employ at 93 a commercial thermostatic valve mounted on the exhaust passage 49 to respond to gas temperatures therein. There is an adjustment at 94 whereby the valve may be set to operate at any desired exhaust gas temperature. This is important, because different products require dehydration to different degrees, and the adjustment at 94 enables the operator to secure exactly the desired dehydration. In practice fifteen pounds pressure is delivered from the reducing valve 92 to the thermostatically controlled valve 93. In the operation of the particular thermostatic valve shown at 93, there is a certain amount of waste oil which is by-passed through pipe 95 to the pump inlet. The operation of the thermostatic valve is such that pressure established beyond the valve when the valve is open, is relieved through the pipe 95 upon the closing of the valve.

When the thermostatically controlled valve 93 is open, oil pressure is communicated through the low pressure line 96 to the damper control 97 by means of which the door or damper 32 for admitting fresh air into the mixing chamber 28, is operated. A tension spring 98 normally holds the damper closed, but is overcome by oil pressure when the thermostatic valve opens.

A branch pipe 99 from the low pressure line 96 leads to the pressure operated controller 100 of valve 101. This valve is located in the high pressure branch 102 of line 90, and leads to a pressure operated controlling device 103 for the rate changing mechanism 78. In order to relieve the controlling device 103 of pressure established therein when valve 101 is opened, I provide a by-pass valve at 104 which is constantly open, and through which a small quantity of oil leaks at all times from pipe 105 to the supply main 86.

The control apparatus is preferably not of the type which is alternatively in its extreme positions. On the contrary, the apparatus disclosed will maintain at all times a graduated rate of feeding material and air, which is directly in accordance with the requirement to produce a uniform temperature and hence a uniform product at the delivery end of the drum.

It will be noted that the burners may, if desired, be set manually for operation at maximum efficiency and continue at all times in such operation without automatic control, although obviously this may be used when desired. In the present apparatus temperature control is effected without any manipulation of the burners whatever. When the temperature rises in the outlet passage 49, the motion of the feeding conveyor and rotary feeding valve is accelerated, thereby immediately increasing the rate at which green or wet material is supplied to the apparatus. This in itself will frequently constitute a sufficient regulation to insure uniform output, but in order that the thermostat 94 may immediately respond to the changed situation, I prefer to use also the damper 32 which is opened simultaneously with the acceleration of the feeding conveyor. The influx of cold air, while relatively small in volume as compared with the hot gases delivered to the mixing chamber 28 by the burners and associated mechanism, will immediately temper such gases, and inasmuch as it takes only a few seconds for gas to pass through the apparatus from inlet to outlet, the result of the tempering will immediately become effective on the thermostat and tend to prevent over-control.

It is very important to note, also, that the influx of air through damper 32 accelerates the gas current through the drum so that I not only temper the heat but increase the speed at which the material moves, thereby decreasing the period of about three minutes for which material of average weight remains in the drum.

In order to exclude extraneous air and thus enable the accurate functioning of the controls above mentioned, I not only pass the green material through the rotary feeding valve 26, but I also provide an inexpensive but relatively airtight joint between the rotating drum and the feeding nozzle 27 at one end, and the discharge pipe 47 at the other. The feeding nozzle and discharge pipe have annular flanges as shown at 110 in the detail view in Fig. 6. Obviously, these flanges are non-rotatable. Their exterior faces are preferably disposed in substantially the exact plane of the respective heads of the drum.

Secured to each drum head is an annular gasket 111 which may be made of asbestos paper, preferably of the heavy sort used in brake and clutch lining. The depression existing within the drum causes air pressure on the annular gasket 111 to hold the gasket tightly in contact with the annular flange 110 with respect to which it rotates. As a result, air is virtually completely excluded from passing through this joint, and the amount of friction involved is negligible. The life of the gasket is long, and replacement thereof is easy.

Dimensional data

While those skilled in the art will be able to utilize the proportionate dimensions of parts illustrated in the accompanying drawings as a basis for the manufacture of devices embodying the invention herein disclosed, it may be useful to furnish specific data covering a commercial machine exemplifying the invention. Obviously, I do not wish to limit the invention to the particular dimensions or proportions indicated.

In the machine illustrated, the overall diameter of the rotatable drum is approximately seven feet, and its length is approximately twenty feet. The diameter of the combustion chambers is approximately three feet, and that of the dry feed separator is approximately five feet.

The main fan is approximately a three foot fan and is operated directly from the driving pulley 60 at an approximate speed of 1150 R. P. M. The drum revolves at approximately 10 R. P. M. The maximum capacity output of dry product from such a dehydrating apparatus will be approximately two tons per hour when the machine is fed with average forage. The total weight of the apparatus is approximately that of portable threshing machine equipment. The power required to operate it will be approximately 30 H. P., as furnished by standard commercial tractors of that rating.

I claim:

1. Dehydrating apparatus comprising the combination with an exhaust fan adapted to establish a current of drying gases sufficient to propel the material to be dried, of a drying chamber communicating with the inlet of said fan and mounted for rotation, said chamber being interiorly partitioned to provide a passage extending back and forth therein and increasing in cross section in approaching said fan, means in said passage for elevating material and dropping it transversely of the passage in the rotation of said chamber, a furnace having a flue communicating with the end of said passage remote from said fan and means for feeding material to be dried into the current of heated gas supplied by said flue to said passage, subject to the action of said fan, and means for controlling substantially completely the admission of unheated air to the current of gas aforesaid, said means comprising gaskets and complementary parts to which said gaskets are held by fan induced depression in said chamber during the rotation thereof, said gaskets and parts being relatively rotatable and disposed at the ends of the drum about the flue and fan connections thereto.

2. Dehydrating apparatus comprising a rotatable drum having openings at its ends, relatively stationary inlet and outlet fittings communicating with the drum through said openings and air excluding means at each of said openings comprising relatively rotatable annular gaskets connected at their outer margins to the drum, and flanges carried by said fittings, and a gas circulating device operatively connected with one of said fittings and adapted to create circulation of gas through said drum and thereby to establish a pressure differential between the interior of said drum and the exterior atmosphere, said gaskets abutting their respective flanges and yieldably subject to said pressure differential.

3. Dehydrating apparatus comprising the combination with a rotatable drum and means for feeding combustible vegetable material thereto, of an inlet fitting communicating axially therewith in the path of such material, a cylindrical combustion chamber communicating with said fitting adjacent one of its ends and adapted to deliver burnt gases across the path of such material, a checker brick wall providing a porous partition between said combustion chamber and the point where such material encounters burnt gases produced in said chamber, a burner disposed tangentially in said combustion chamber at a point spaced from the point of communication aforesaid, and means for feeding combustible fuel of proper mixture with air through the burner, whereby substantially complete combustion in said chamber is ensured by the helical travel of burning gases issuing from said burner.

4. A portable dehydrating apparatus comprising the combination, of a drying drum rotatably mounted and provided with an inlet nozzle at its end, an exhaust fan connected with the other end of the drum, furnace means operatively connected to supply hot gases to said nozzle and a feeding throat communicating with said nozzle and provided with a conveyor, and a rotary valve for the delivery of substantially air free material into said nozzle in the path of gases from said furnace, said furnace means comprising a pair of cylindrical combustion chambers disposed at opposite sides of the nozzle and provided at mutually remote points with substantially tangential burners whereby to be adapted to feed products of combustion in a helical path through said chambers to said nozzle.

5. Dehydrating apparatus comprising the combination with a furnace adapted to supply a heated gas, of a chamber provided with an elongated drying passage of increasing cross section connecting at its inlet end to receive gas from the furnace, a conveyor provided with a discharge throat communicating with said passage and adapted in the operation of the conveyor to deliver material to be dried into the path of the heated gas in said passage, means for exhausting gas from the larger cross section end of the passage, whereby to provide in said passage a gas current of sufficient proportions to convey pneumatically through the passage the material to be dried, a thermostat exposed to exhaust gas temperature and actuating connections for the feeding conveyor including a speed governor operatively connected for regulation by said thermostat.

6. Dehydrating apparatus comprising the combination of a rotatable drum provided with a passage of increasing cross section and bucket means adapted to elevate and discharge across said passage the material to be dried, a furnace operatively connected to supply hot gas to the inlet end of the passage, an exhaust fan operatively connected to withdraw gas from the outlet end of the passage, the current of gas in the passage being sufficient to propel therethrough at a rate dependent upon the dryness of the material and the decreasing velocity of the current, a feeding conveyor adapted to deliver material to be dried into the path of the gas passing through said drum and provided with a delivery throat communicating with the interior of said drum, a thermostat exposed to the temperature of gas at the exhaust end of said drum and actuating connections for said conveyor including regulating mechanism operatively connected for control by said thermostat whereby the operation of said conveyor is made dependent upon the temperature of exhaust gas from said drum.

7. Dehydrating apparatus comprising the combination of a rotatable drum provided with a passage of increasing cross section and bucket means adapted to elevate and discharge across said passage the material to be dried, a furnace operatively connected to supply hot gas to the inlet end of the passage, an exhaust fan operatively connected to withdraw gas from the outlet end of the passage, the current of gas in the passage being sufficient to propel therethrough at a rate dependent upon the dryness of the material and the decreasing velocity of the current, a feeding conveyor adapted to deliver material to be dried into the path of the gas passing through said drum and provided with a delivery throat communicating with the interior of said drum, a thermostat exposed to the temperature of gas at the exhaust end of said drum and actuating connections for said conveyor including regulating mechanism operatively connected for control by said thermostat whereby the operation of said conveyor is made dependent upon the temperature of exhaust gas from said drum, together with means for depositing a substantially uniform layer of material to be dried upon said conveyor.

8. The combination with a drying chamber and means for circulating therethrough a drying medium and the material to be dried, of means for regulating the drying operation in said chamber automatically in accordance with the temperature of said medium as it leaves said chamber, said means comprising a thermostat exposed to such temperature, a feeding conveyor for the material to be dried, actuating connections for said feeding conveyor including a regulator operatively connected with said thermostat for control thereby, a supply pipe for the drying medium and a damper in said pipe operatively connected with said thermostat for operation simultaneously with said regulator whereby to temper the drying medium with atmospheric air.

9. Dehydrating apparatus comprising the combination of a drying passage, a furnace operatively connected to supply heated gas thereto and a feeding conveyor for material to be dried, of an exhaust fan connected to said passage to withdraw the drying gas therefrom, a thermostat subject to the temperature of the gas withdrawn, a damper for said furnace arranged to temper the heat of the gas delivered thereby through the admission of atmospheric air to such gas, actuating connections for said conveyor including means for controlling the operation thereof and operative connections between said thermostat, said damper and said conveyor controlling means automatically adapted to open said damper and simultaneously to feed additional material to be dried upon a rise in temperature of the discharge gas.

10. Dehydrating apparatus comprising the combination with a rotatable drum provided internally with flights for the lifting of material to be dried and the discharge of said material transversely of said drum, of means for feeding to the inlet end of said drum material to be dried, means for heating and delivering fresh atmospheric air to said drum, damper controlled means for admitting previously unused fresh air in addition to that normally heated, whereby to reduce the temperature of the air admitted to the drum and increase its volume, and suction means applied to said drum at a point remote from the point at which said material enters the drum, said suction means operating at a capacity such as to produce a material-propelling current of air through and from the drum while maintaining a partial vacuum therein, and means for separating from the air withdrawn from the drum the material entrained therewith, together with a thermostat subject to the temperature of the exhaust air and permanently discharged from said drum operatively connected to regulate said damper, the opening of the damper being adapted not only to reduce the temperature of the air but also to accelerate the movement of the material through the drum.

11. In a dryer, a furnace for supplying heated gas previously unused for dehydration, a drum having a chamber provided with drying passages of increasing cross-section one of which has its inlet end communicating with said furnace, a conveyor communicating with said passage and operable to deliver material to be dried into the path of the heated gas delivered to said passages from said furnace, means for exhausting and permanently discharging gas from the larger end of another of said passages to produce in said passages a gas current of sufficient velocity to penumatically convey through said passages all of the material to be dried, and a thermostat exposed to the temperature of the gases finally exhausted from said passages for controlling the operation of said conveyor.

12. In a dryer, a drum forming a drying chamber, suction means for propelling through said chamber in the same direction both a previously unused drying medium and the material to be dried, means for separating the medium from the other material and for permanently discharging the medium, and means operable by the temperature of the permanently discharged medium for automatically controlling the relative rate of travel of the material and said medium and thereby controlling the drying operation within said chamber.

13. In a dryer, a drum forming a drying chamber, a furnace for supplying heated gas to said chamber for drying purposes, suction means for propelling through said chamber both the gas from said furnace and the material to be dried, means for separating the gases from the other material and for permanently discharging the gases, means operable by the temperature of the permanently discharged gases for automatically controlling the relative rate of travel of the material and said medium and thereby controlling the drying operation within said chamber, and means operable by the temperature of the permanently discharged gases for automatically controlling the temperature of the gases delivered to said chamber from said furnace.

GERALD D. ARNOLD.